(12) United States Patent
Kim et al.

(10) Patent No.: US 8,417,292 B2
(45) Date of Patent: Apr. 9, 2013

(54) DEVICE-ADAPTIVE CONNECTION ESTABLISHING METHOD AND SYSTEM FOR A MOBILE TERMINAL

(75) Inventors: Hyoung Sup Kim, Seongnam-si (KR); Hyo Jeong Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 736 days.

(21) Appl. No.: 12/124,900

(22) Filed: May 21, 2008

(65) Prior Publication Data
US 2008/0311955 A1 Dec. 18, 2008

(30) Foreign Application Priority Data

Jun. 18, 2007 (KR) .................. 10-2007-0059474

(51) Int. Cl.
*H04B 1/38* (2006.01)
*G06F 3/00* (2006.01)
*G06F 13/12* (2006.01)
(52) U.S. Cl. ............... 455/557; 455/573; 455/569.1; 710/15; 710/63; 710/72
(58) Field of Classification Search .............. 455/557, 455/569.1, 573; 710/15, 16, 63, 65, 72
See application file for complete search history.

(56) References Cited

U.S. PATENT DOCUMENTS

| | | | |
|---|---|---|---|
| 6,577,883 B1 * | 6/2003 | Ueda ............................ 455/573 |
| 6,774,604 B2 * | 8/2004 | Matsuda et al. .............. 320/110 |
| 7,296,107 B2 * | 11/2007 | Lunsford et al. ............. 710/304 |
| 7,656,888 B2 * | 2/2010 | Lee et al. ...................... 370/421 |
| 7,711,870 B2 * | 5/2010 | Yoshida et al. ................ 710/16 |
| 7,849,238 B2 * | 12/2010 | Wang et al. .................... 710/63 |
| 2002/0169915 A1 * | 11/2002 | Wu ............................... 710/305 |
| 2003/0030412 A1 * | 2/2003 | Matsuda et al. .............. 320/127 |
| 2004/0030818 A1 * | 2/2004 | Chen et al. ...................... 710/74 |
| 2004/0243726 A1 * | 12/2004 | O'Keefe et al. .................. 710/1 |
| 2005/0039060 A1 * | 2/2005 | Okayasu ....................... 713/300 |
| 2006/0258400 A1 | 11/2006 | Lee |
| 2007/0018611 A1 * | 1/2007 | Anttila et al. ................. 320/114 |
| 2008/0272741 A1 * | 11/2008 | Kanamori ..................... 320/137 |
| 2010/0169543 A1 * | 7/2010 | Edgington et al. ........... 711/103 |

FOREIGN PATENT DOCUMENTS

CN 1866757 A 11/2006

* cited by examiner

*Primary Examiner* — Duc M Nguyen
(74) *Attorney, Agent, or Firm* — Jefferson IP Law, LLP (57) ABSTRACT

A device-adaptive connection establishing method and system for a mobile terminal that is capable of identifying an external device based on a variation of signals exchanged between the mobile terminal and the external device and establishing an electrical connection adaptive to the external device is provided. A device-adaptive connection establishing method of the present invention includes detecting a connecting of an external device to the mobile terminal, detecting a signal transmitted between the external device and the mobile terminal, comparing the signal with previously stored reference values, and determining a type of the external device based on a result of the comparison.

15 Claims, 5 Drawing Sheets

DEVICE-ADAPTIVE CONNECTION ESTABLISHING METHOD AND SYSTEM FOR A MOBILE TERMINAL

PRIORITY

This application claims the benefit under a Korean patent application filed in the Korean Intellectual Property Office on Jun. 18, 2007 and assigned Serial No. 2007-0059474, the entire disclosure of which is hereby incorporated by reference.

BACKGROUND OF THE INVENTION

1. Field of the Invention

The present invention relates to a mobile terminal. More particularly, the present invention relates to a device-adaptive connection establishing method and system for a mobile terminal that is capable of identifying an external device based on a variation of a signal flowing between the mobile terminal and the external device and establishing an electrical connection adaptive to the external device.

2. Description of the Related Art

Portable devices are used in various situations and places due in large part to their portability and advances made in their storage capacity and functionality. In particular, the popularity of mobile phones has increased dramatically over recent years due to their convergence with various multimedia functionalities while maintaining voice communication capabilities.

Early mobile phones were large in size and were heavy. Recently, with advances in battery and device integration technologies, mobile devices are being manufactured in slimmer and more compact form factors. However, as mobile devices are becoming slimmer and more compact, charging interfaces and positions of the batteries are being varied in association with the hardware configuration of the mobile devices. For example, many commercialized mobile phones are provided with different charging and connection interfaces.

Meanwhile, a mobile phone is implemented with a combined interface for operating in a power charging mode and a data communication mode, whereby the mobile phone connects to a battery charger through a power cable or to an external device through a data cable by means of the combined interface. Typically, the electrical connection of the mobile phone to the battery charger and the external device is at different voltage levels. Accordingly, if the mobile terminal misrecognizes an external device as a battery charger, the external device may be significantly damaged by an excessive voltage level. For example, when the mobile terminal misrecognizes a voltage sensitive external device such as a laptop computer as a battery charger so as to attempt to communicate with the device at a battery charging voltage level, the central processing unit and peripheral components of the laptop computer are likely to be damaged. Thus, there is a need for developing a device recognition method.

SUMMARY OF THE INVENTION

An aspect of the present invention is to address the above-mentioned problems and/or disadvantages and to provide at least the advantages described below. Accordingly, an aspect of the present invention is to provide a device-adaptive connection establishing method and system for a mobile terminal that is capable of distinctively identifying external devices and establishing an electrical connection adaptively to the identified device.

In accordance with an aspect of the preset invention, a device-adaptive connection establishing method for a mobile terminal is provided. The method includes detecting a connecting of an external device to the mobile terminal, detecting a signal transmitted between the external device and the mobile terminal, comparing the signal with previously stored reference values, and determining a type of the external device based on a result of the comparison.

In accordance with another aspect of the present invention, a mobile terminal is provided. The terminal includes an interface unit for connecting the mobile terminal to an external device, an external device detection unit for identifying a type of the external device by comparing a signal received from the external device and previously stored reference values, and a control unit for controlling the interface unit and the external device detection unit and for communicating a control signal to the external device based on the identified type of the external device.

In accordance with another aspect of the present invention, an electrical supply apparatus for use with a mobile device is provided. The apparatus includes a body, a pair of spaced-apart parallel flat blades protrudable from the body for insertion into an electrical socket, and an interface secured in the body for connecting to a mobile device, for supplying electrical energy to the mobile terminal and for supplying an identifier to the mobile terminal.

In accordance with another aspect of the present invention, a device-adaptive connection establishing system is provided. The system includes a mobile terminal and an electrical supply unit. The mobile terminal includes a first interface unit comprising a plurality of contacts for connecting the mobile terminal to an external device, wherein the external device is at least one of an external communication device and an electrical supply unit, an external device detection unit for determining if the first interface is connected with the electrical supply unit based on an electrical short between two of the plurality of contacts, and a control unit for controlling the interface based on the first interface being connected with the electrical supply unit, when the external device detection unit determines that the first interface is connected with the electrical supply unit. The electrical supply unit includes a body, a pair of spaced-apart parallel flat blades protrudable from the body for insertion into an electrical socket, and an second interface secured in the body for connecting to the first interface of the mobile device, for supplying electrical energy to the first interface of the mobile terminal and for supplying the electrical short between the two of the plurality of contacts of the first interface unit of the mobile terminal.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and phrases used in the specification and appended claims are provided to enable a clear and consistent understanding of the detailed description and the claims. Unless otherwise noted, the terms and phrases are to be understood according to conventional usage by those skilled in the relevant art. While the invention is shown and described with reference to certain exemplary embodiments thereof, it will be understood by those skilled in the art that various changes in form and details may be made therein without departing from the spirit and scope of the invention as defined by the appended claims and their equivalents.

In the following exemplary embodiments, the device-adaptive connection establishing method and system of the present invention is described in association with a battery charger and a personal computer (PC) as the external devices to be connected to the mobile terminal. However, the present invention is not limited thereto. For example, the external device can be any of another mobile terminal, Personal Digital Assistant (PDA), laptop computer, game console, etc. that have an interface supporting data communication with the mobile terminal.

Also, the mobile terminal can be any of Code Division Multiple Access (CDMA) terminal, digital broadcast receiver, PDA, Smartphone, 3rd generation (3G) communication terminal such as Wideband CDMA (WCDMA) terminal and CDMA2000 terminal, and their equivalents.

Figure 1:
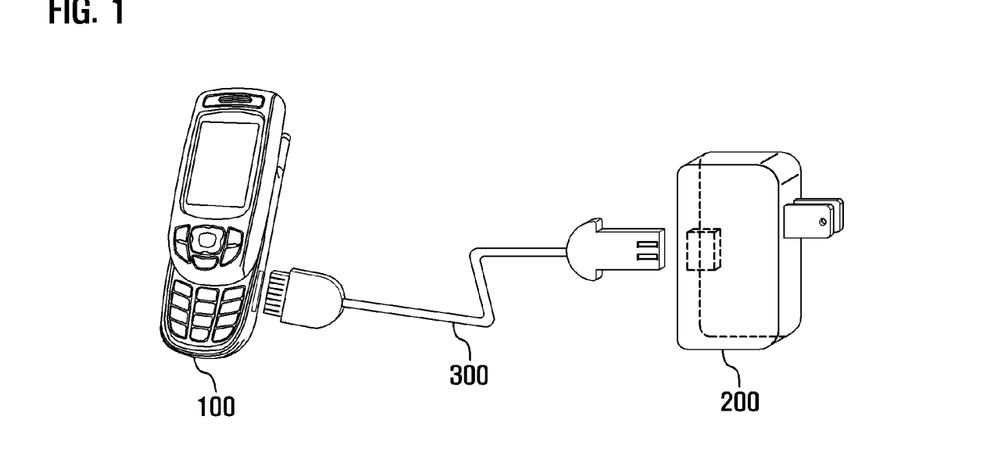
FIG. 1 is a schematic diagram illustrating a device-adaptive connection establishing system according to an exemplary embodiment of the present invention.

FIG. 1 is a schematic diagram illustrating a device-adaptive connection establishing system according to an exemplary embodiment of the present invention.

As shown in FIG. 1, a device-adaptive connection establishing system according to an exemplary embodiment of the preset invention includes a mobile terminal 100 and an external device 200 that are connected via a connection cord 300. The connection cord 300 can be a part of the mobile terminal 100 or external device 200.

Referring to FIG. 1, the mobile terminal 100 receives a signal from the external device 200 through the connection cord 300 and compares the signal with reference values that are previously stored to identify the external device 200. In this exemplary embodiment, the external device 200 is an electrical supply unit, such as a battery charger for charging the battery of the mobile terminal 100. The signal may be an identifier such a short circuit.

Figure 2:
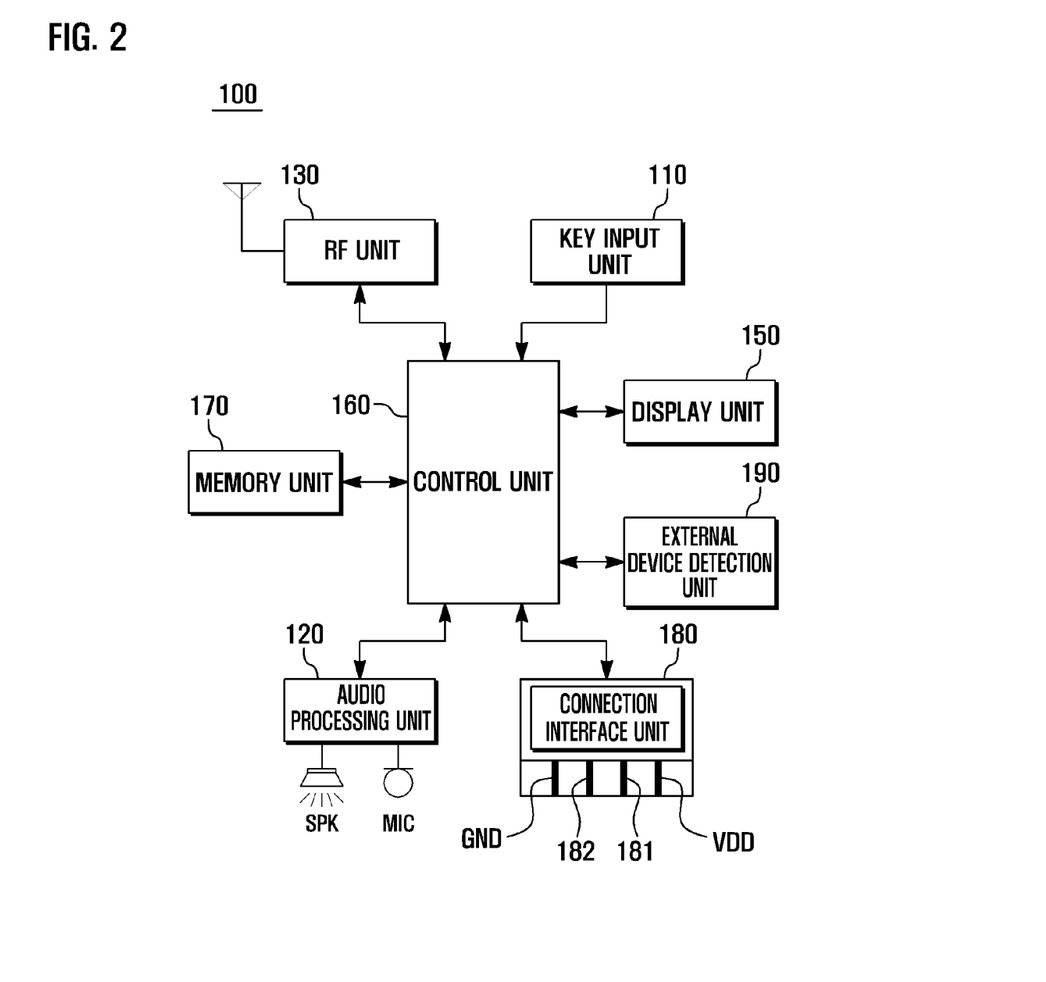
FIG. 2 is a block diagram illustrating a configuration of the mobile terminal of FIG. 1.

FIG. 2 is a block diagram illustrating a configuration of the mobile terminal of FIG. 1.

Referring to FIG. 2, the mobile terminal 100 includes a radio frequency (RF) unit 130, a key input unit 110, a memory unit 170, a display unit 150, an audio processing unit 120, a connection interface unit 180, an external device detection unit 190, and a control unit 160.

The key input unit 110 is provided with a plurality of alphanumeric keys for inputting alphanumeric data and a plurality of function keys for configuring and executing functions of the mobile terminal 100. The function keys may include navigation keys, side keys and shortcut keys for executing specific functions. The key input unit 110 transmits the key signals generated in response to the key inputs to the control unit 160.

In particular, the key input unit 110 is configured to generate control signals in response to corresponding keys and transmits the control signals to the control unit 160. The control signals can be generated by the external device 200. That is, the external device 200 can be an auxiliary key input device which emulates the key input unit 110 for generating the control signals.

The audio processing unit 120 processes the audio data received from the RF unit 130 so as to output the audio data through a speaker (SPK) in the form of audible sound and processes the audio signal input through a microphone (MIC) so as to output the audio signal to the control unit 160 in the form of audio data. The audio processing unit 120 may be configured to output an alert sound for notifying of the connection of the external device 200 with the mobile terminal 100. The audio processing unit 120 can be replaced by the external device 200. That is, the external device 200 can be an independent audio device which plays audio data and transmits audio signal collected through its microphone to the control unit 160.

The RF unit 130 is responsible for establishing a radio channel with a mobile communication system to transmit and receive voice and data to and from another mobile terminal via the mobile communication system. In order to process the radio signal, the RF unit 130 is provided with an RF transmitter for up-converting and amplifying the transmission signal and an RF receiver for low-noise amplifying and down-converting the received signal. The functionality of the RF unit 130 can be replaced by those of the external device 200 when the external device is a communication module such as portable modem.

The display unit 150 displays various menu screens associated with specific functions of the mobile terminal 100 and information provided to and by a user. In particular, the display unit 150 may be configured to display an image for identifying the external device 200 and/or a connection therewith when the external device 200 is connected to the mobile terminal 100. For example, if a PC is connected to the mobile terminal 100 through the connection cord 300, the display unit 150 displays an image of the PC. Also, if a battery charger is connected to the mobile terminal 100, the display unit 160 displays an image of the battery charger or a charging status image or text. The display unit can be implemented with a Liquid Crystal Display (LCD) that may include a touchscreen function. In this case, the display unit 150 acts as a part of the key input unit 110.

The memory unit 170 stores one or more application programs associated with the execution of the functions of the mobile terminal 100, user data generated while the applications operate, and settings configured by the user temporarily or semi-permanently. The memory unit 170 is also responsible for buffering the signals transmitted and received through the RF unit 130. The memory unit 170 may be divided into a program region and a data region.

The program region stores the operating system (OS) of the mobile terminal 100, application programs for executing the functions of the mobile terminal 100, and optional settings of the functions such as a camera function, audio playback function, and video playback function.

If a specific function is activated in response to a user request, the mobile terminal 100 executes application programs associated with the function under the control of the control unit 160. In particular, the program region stores the application programs operating in association with the external device 200 that are enabled when the external device 200 is connected to the mobile terminal 100.

The data region stores the application data generated when the mobile terminal 100 operates in association with individual application programs and the user data obtained with optional settings associated with the applications such as a still and motion picture taken by the camera function, phonebook data, and audio data recorded by the user. The data region stores the reference values of the external devices that can be connected to the mobile terminal 100. The reference values are values referred when individual external devices are connected to the mobile terminal 100. For example, the reference value of a battery charger establishing an electrical connection to the mobile terminal 100 at 5V is 5V. Also, the reference value of a laptop computer establishing an electrical connection to the mobile terminal 100 at 3V is 3V. The reference values are transmitted to the external device detection unit 190 or the control unit 160.

The connection interface unit 180 is provided with a first and second signal pins 181 and 182 for establishing an outgoing and an incoming connections with an external device 200, a ground pin (GND), and a power supply pin (VDD) for establishing a power line with an external device 200. The connection interface unit 180 can transmit data using the difference of signal levels between the first and second signal pins 181 and 182. The signal level on the first signal pin 181 is achieved by leveling down from a predetermined voltage, and the signal level on the second signal pin 182 is achieved by leveling up from a ground voltage. For example, the signal level of the first signal pin 181 is up and down in the range between 1.5V and 3V, and the signal level of the second signal pin 182 is up and down in the range between the ground voltage and 1.5V. The first signal pin 181 may be provided with a voltage storage for storing a pull-up voltage for informing, when the external device 200 is connected to the mobile terminal 100, the external device 200 of the connection. The voltage storage maintains the pull-up voltage and transmits the pull-up signal to the external device 200. Accordingly, the external device 200 recognizes that it is connected to the mobile terminal 100 and transmits control signals to the mobile terminal 100 through the first and second signal lines. The pull-up voltage is maintain in the range, e.g., between 3.0V and 3.3V. The pull-up voltage may be changed depending on the kind of mobile terminal. The connection interface unit 180 can be implemented with any of a connector port and a Universal Serial Bus (USB) port.

The external device detection unit 190 determines which device is connected through the connection interface unit 180.

Figure 3:
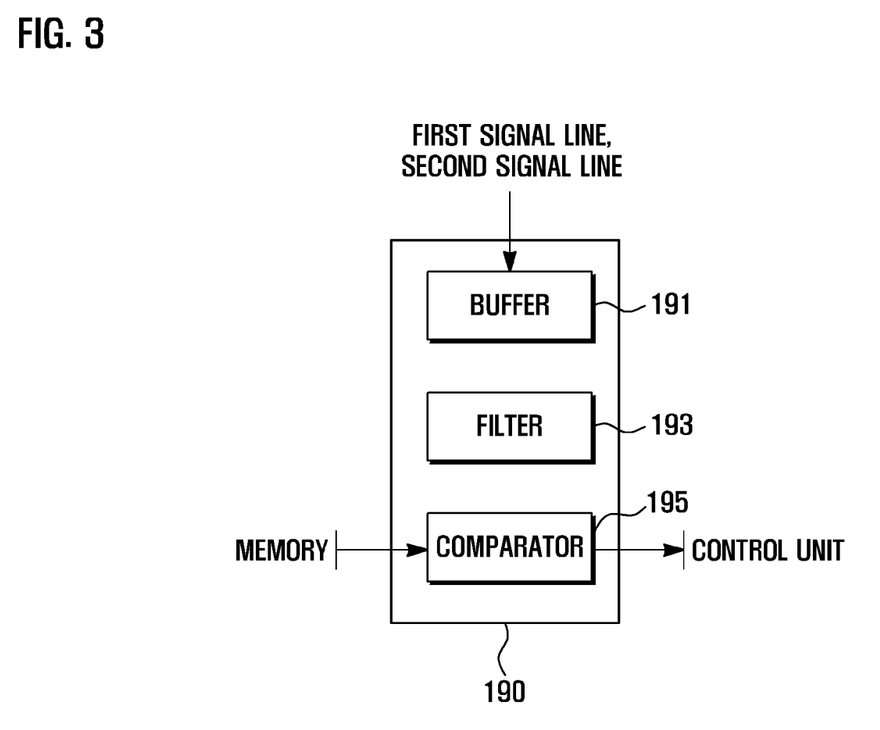
FIG. 3 is a block diagram illustrating a configuration of the external device detection unit of FIG. 2.

FIG. 3 is a block diagram illustrating a configuration of the external device detection unit of FIG. 2. As shown in FIG. 3, the external device detection unit 190 includes a buffer 191, a filter 193, and a comparator 195.

The buffer 191 is responsible for buffering pulse signals such as static electricity, overcurrent, and overvoltage that may occur when the external device 200 is connected to the connection interface unit 180. The buffer 191 is connected to at least one of the first and second signal pins 181 and 182 for buffering the signal transmitted and received therethrough. That is, the buffer 191 stabilizes the connection between the mobile terminal 100 and the external device 200 and detects the incoming and outgoing signals. The buffer 191 may be omitted according to a change of usage of the external device detection unit 190.

The filter 193 converts the signal detected by the buffer 191 into direct current. That is, the filter 193 is configured to detect an average value of amplitude variation of the signal detected by the buffer 191. The filter 193 can be implemented with a Resistor-Capacitor (RC) filter composed of resisters and capacitors arranged in parallel or the like.

The comparator 195 compares the signal value filtered by the filter 193 with the reference values and identifies the external device 200 based on the comparison result. Preferably, the average values filtered by the filter 193 in association with the external devices are stored as the reference values.

The control unit 160 controls general operations of the mobile terminal 100 and signaling among the internal components of the mobile terminal. In a case where the mobile terminal is a mobile phone, the control unit 160 integrates a modem and a codec. The control unit 160 receives the detection result of the external device detection unit 190 and processes the signals to be transmitted to the external device 200 and the signals received from the external device 200 based on the detection result. If it is determined that the external device is a laptop computer, the control unit 160 controls such that the current flowing to the external device 200 does not exceed a preset value, for example, 750 mA. The control unit 160 may be integrated with the external device detection unit 190.

The control unit 160 can be implemented with two central processing units (CPUs). In more detail, in the case where the mobile terminal 100 is a mobile phone, the control unit 160 may be composed of a first CPU which is responsible for voice and data communications and a second CPU which is responsible for executing other functions such as camera function, audio and video playback functions, battery charging function, serial data communication function, etc. in this case, the second CPU may integrate the external device detection unit 190. Accordingly, when the external device 200 is connected to the mobile terminal 100, the second CPU identifies the type of the external device 200 by means of the external device detection unit 190 and determines whether to connect the external device to the first CPU according to the type of the external device 200. In a case where the external device 200 is determined to be a battery charger, the second CPU activates a battery charging function so as to charge the battery of the mobile terminal 100. If it is determined that the external device 200 is attempting to use a wireless communication function of the mobile terminal 100, the second CPU controls to establish a connection to the first CPU. In order to selectively connect the external device 200 to the first and second CPUs, the mobile terminal 100 may further include a switch between the first and second CPUs.

Although the mobile terminal of FIG. 1 is schematically depicted, the configuration of the mobile terminal 100 is not limited thereto. For example, the mobile terminal 100 may include a digital broadcast reception module, a multimedia module, or the like.

Figure 4:
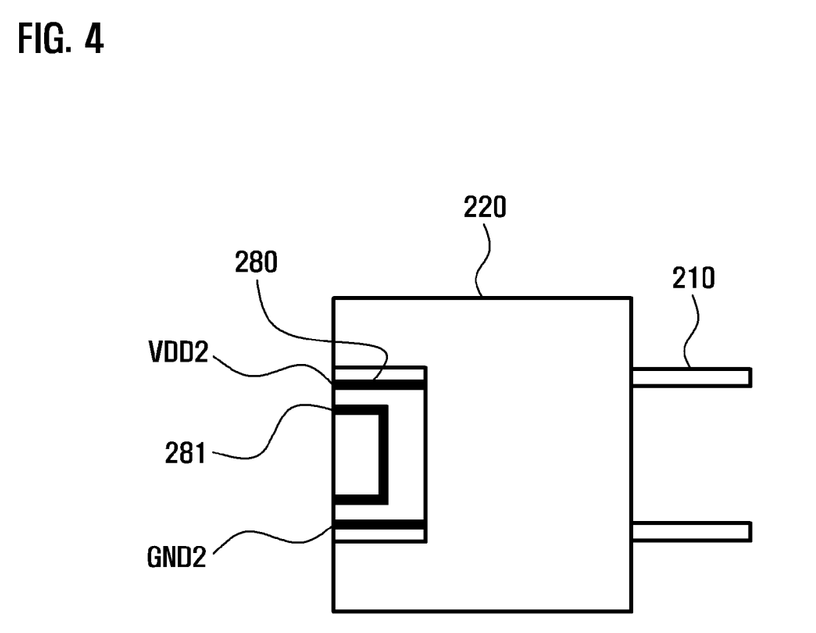
FIG. 4 is a block diagram illustrating a configuration of the external device of FIG. 1.

FIG. 4 is a block diagram illustrating a configuration of the external device of FIG. 1.

In the case where the external device 200 is an electrical supply unit such as a battery charger, it includes a pair of flat blades 210 and a connection interface 280 secured in a body 220.

The blades may be inserted into corresponding slots of an electrical socket so as to establish an electrical connection. The blades 210 may be pivotable with respect to the body so as to rotate into a stored position. The stored position may be a position in which the blades 210 are substantially within the body 220. The stored position of the blades 210 prevents the blades 210 from being damaged while the external device 200 is being transported or stored. The body 220 has a shape of a plug so as to facilitate being inserted and withdrawn from an electrical socket. In an exemplary embodiment, the connection interface 280 is secured at one side of the body 200 on a side opposite to the blades 210. The connection interface 280 is provided with a high voltage contact (VDD2), a ground contact (GND2), and a signal contact 281. The connection interface 280 can be implemented with a specific standard connector port such as a USB port. When the power charger is connected to the mobile phone 100 via the connection cord 300, the signal contact 281 is shorted to the first and second signal pins 181 and 182 of the connection interface unit 180 of the mobile terminal 100 such that the pull-up voltage of the mobile terminal 100 flows through the first and second signal lines 181 and 182 and the signal contact 281.

In a case where the external device 200 is not a battery charger, the signal contact 281 is not shorted so as to connect to a circuit established in the body 200. For example, if the external device is a computer, the signal contact 281 connects the first and second signal lines 181 and 182 of the mobile terminal 100 to a CPU of the computer, i.e. the body 220.

The connection cord 300 establishes an electrical connection between the mobile terminal 100 and the external device 200. The connection cord 300 is provided with a first connector to be connected to the connection interface unit 180 of the mobile terminal 100 at one end and a second connecter to be connected to the connection interface 280 of the external device 200. The first connector is provided with contact pins corresponding to the pins of the connection interface unit 180, and the second connector is provided with contact pins corresponding to the contacts of the connection interface 280. In a case where the external device is provided with a connection interface which can be directly connected to the connection interface unit 180 of the mobile terminal 100, the connection cord 300 is not needed.

Figure 5A:
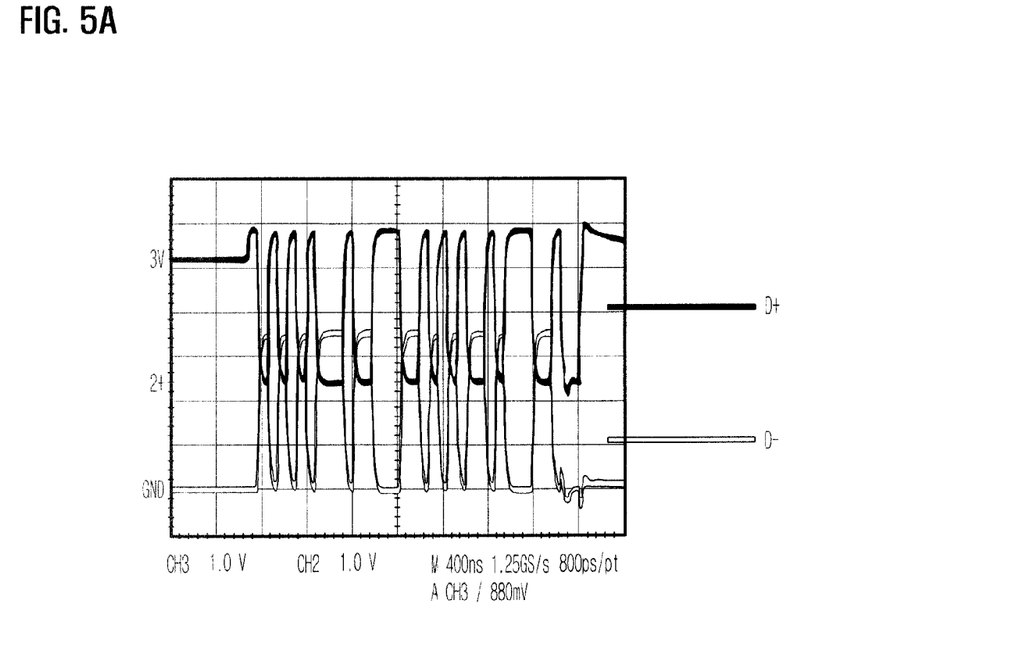
FIGS. 5A to 5C are graphs illustrating waveforms of signals detected when distinctive external devices are connected to the mobile terminal.
Figure 5B:
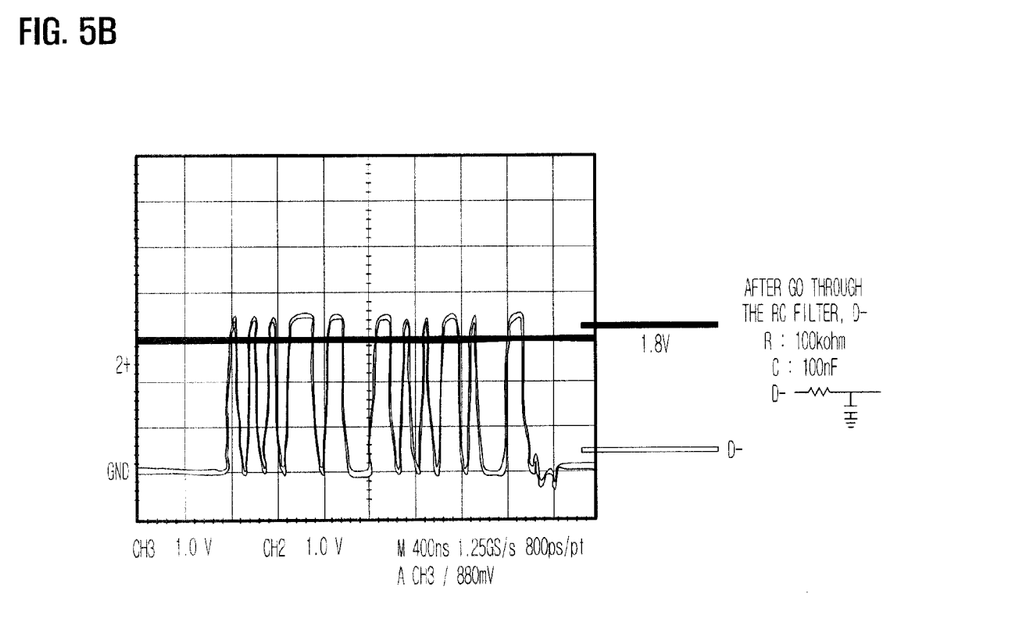
Figure 5C:
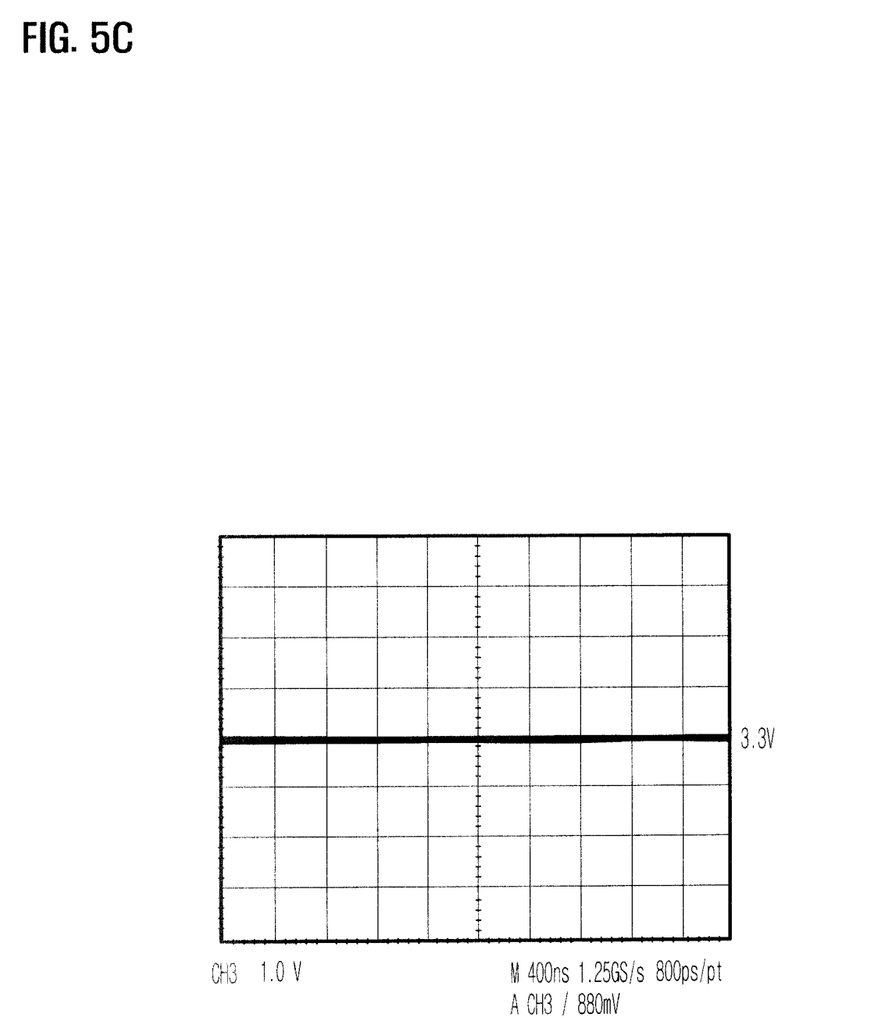

FIGS. 5A to 5C are graphs illustrating waveforms of signals detected when distinctive external devices are connected to the mobile terminal.

FIG. 5A shows waveforms detected on the first and second signal pins 181 and 182 of the connection interface unit 180 when an external device is connected to the mobile terminal 100. In FIG. 5A, the waveform shown at the upper part of the graph is a signal detected on the first signal pin 181, and the waveform shown at the lower part of the graph is a signal detected on the second signal pin 182. As shown in the graph, the signals flowing along the first and second signal lines 181 and 182 are symmetrical with each other on a horizontal axis. Such symmetrical wave forms are robust to noise.

FIG. 5B shows waveforms of a signal detected on the second signal pin 182 and a signal filtered by the filter 193 when an external device 200 which is able to communicate with the mobile terminal 100 is connected. In FIG. 5B, the signal received through the second signal pin 182 has a waveform which rises and falls between two predetermined voltage levels, e.g., the ground voltage and 3V. The signal received through the second signal pin 182 is converted to direct current by the filter 193 so as to be shown as a flat voltage, e.g. 0.8V as shown in FIG. 5B.

FIG. 5C shows a waveform detected on the first and second signal pins 181 and 182 when the external device 200 connected to the mobile terminal 100 is a battery charger. In this case, since the battery charger does not exchange data with the mobile terminal 100, a pull-up voltage output by the external device detection unit 190 flows on the first and second signal pins 181 and 182. Accordingly, the signals detected on the first and second signal lines 181 and 182 have a predetermined pull-up voltage, e.g. 3.3V.

As described above, a device-adaptive connection establishing system of the present invention detects signals flowing between the mobile terminal 100 and an external device connected to the mobile terminal 100 and establishes an appropriate electrical connection based on the detected signals.

The operations of the above structured device-adaptive connection establishing system are described hereinafter in more detail.

Figure 6:
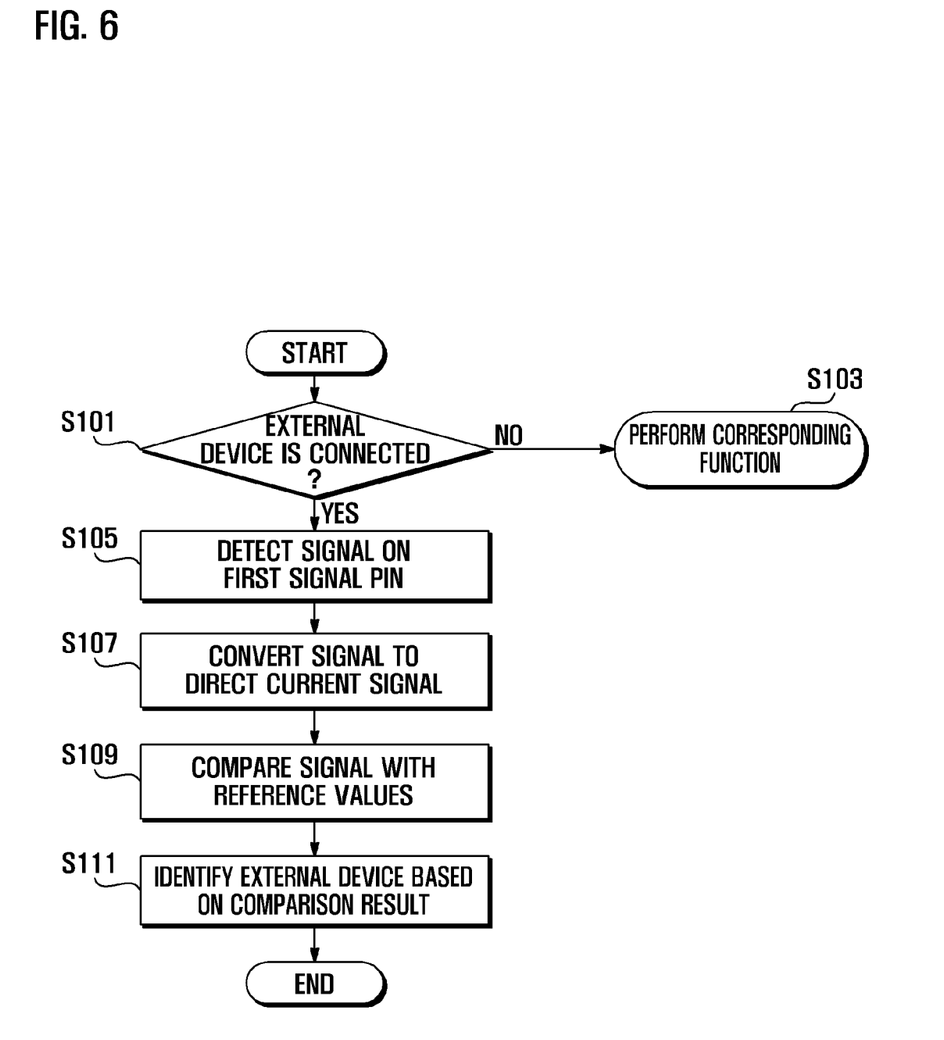
FIG. 6 is a flowchart illustrating a device-adaptive connection establishing method according to an exemplary embodiment of the present invention.

FIG. 6 is a flowchart illustrating a device-adaptive connection establishing method according to an exemplary embodiment of the present invention.

Referring to FIG. 6, in the device-adaptive connection establishing method according to an exemplary embodiment of the present invention, the control unit 160 determines whether an external device is connected in step S101. That is, the control unit 160 checks whether a signal is received from the connection interface unit 180 and, if a signal is detected, determines that an external device is connected. In more detail, when an external device is connected to the mobile terminal 100, the pull-up voltage buffered in the connection interface unit 180 is transmitted to the external device 300 through the connection line. Upon detecting the pull-up voltage, the external device 200 recognizes the connection to the mobile terminal 100 and transmits a control signal to the mobile terminal 100. The control signal can be a signal for initializing a data communication with the mobile terminal or a power signal for charging the battery of the mobile terminal. Here, the control signal may have a waveform having an amplitude that varies between preset reference voltages.

If no external device is detected, the control unit 160 performs a preset function in response to a user's request, e.g., voice communication, camera, and file playback functions in step S103.

If it is determined that an external device is connected, the control unit 160 detects the signals on at least one of the first and second signal pins 181 and 182 by means of the external device detection unit 190 in step S105. In this exemplary embodiment, the external device detection unit 190 senses one or both of the first and second signal pins 181 and 182. At this time, the control unit 160 reads the reference values from the memory unit 170. The signal to be sensed by the external device detection unit 190 can determined depending on the designer's intention. The signal flowing through the signal pin may be buffered for stabilizing the circuitry of the external device detection unit 190.

Next, the control unit 160 controls such that the detected signal is converted to direct current by the filter 193 of the external device detection unit 190 in step S107. The filter 193 may be composed with resisters and capacitors for converting the signal to a direct current signal. Sequentially, the control unit 160 compares the direct current signal with the reference values read from the storage unit 170 in step S109. In a case where the external device 200 is a battery charger, the signal contact 281 of the battery charger is shorted to the first and second signal pins 181 and 182 such that the pull-up voltage applied to the first signal pin 181 flows to the second signal pin 182 and the signal contact 281, whereby the external device detection unit 190 detects the pull-up voltage. Accordingly, the control unit 160 can recognize the external device 200 as the battery charger based on the detected pull-up voltage.

After comparing the detected signal and the reference values, the control unit 160 identifies the external device 200 based on the comparison result in step S111 and performs operations preset in association with the external device. That is, the control unit 160 may control power supplied to the battery in association with the battery charger and controls a serial data communication in association with the computer.

Although exemplary embodiments of the present invention are described in detail hereinabove, it should be clearly understood that many variations and/or modifications of the basic inventive concepts herein taught which may appear to those skilled in the present art will still fall within the spirit and scope of the present invention, as defined in the appended claims and their equivalents.

As described above, the device-adaptive connection establishing method and system of the present invention allows for the distinctive identification of an external device physically connected to the mobile terminal and the establishment of an appropriate electrical connection adapted to the identified device.

What is claimed is:

1. A device-adaptive connection establishing method for a mobile terminal, comprising:
   detecting a connecting of an external device to the mobile terminal;
   detecting a signal transmitted from the external device;
   comparing the signal with previously stored reference values;
   determining a type of the external device based on a result of the comparison; and
   controlling a current flowing to the external device not to exceed a preset value based on the result of the comparison,
   wherein the signal, as transmitted from the external device, includes a first waveform comprising a level that fluctuates in a high voltage range and a second waveform comprising a level that fluctuates in a low voltage range, and
   wherein the first waveform and the second waveform respectively fluctuate at the same time.

2. The device-adaptive connection establishing method of claim 1, further comprises reading the reference values from the memory of the mobile terminal.

3. The device-adaptive connection establishing method of claim 1, further comprises buffering the signal.

4. The device-adaptive connection establishing method of claim 1, wherein the signal is a pull-up voltage set for the mobile terminal.

5. The device-adaptive connection establishing method of claim 4, wherein the external device is determined as an electrical supply unit based on the pull-up voltage.

6. The device-adaptive connection establishing method of claim 1, further comprises determining a communication voltage between the mobile terminal and the external device based on the result of the comparison.

7. A mobile terminal comprising:
   an interface unit for connecting the mobile terminal to an external device;
   an external device detection unit for identifying a type of the external device by comparing a signal received from the external device and previously stored reference values; and
   a control unit for controlling the interface unit and the external device detection unit and for transmitting a control signal to the external device based on the identified type of the external device,
   wherein the previously stored reference values are stored on a memory of the mobile terminal,
   wherein the signal, as transmitted from the external device, includes a first waveform comprising a level that fluctuates in a high voltage range and a second waveform comprising a level that fluctuates in a low voltage range, and
   wherein the first waveform and the second waveform respectively fluctuate at the same time.

8. The mobile terminal of claim 7, wherein the interface unit comprises:
   a high voltage pin for transmitting a high voltage signal;
   a ground voltage pin for grounding; and
   a first and second signal pins for establishing a bi-directional transmission with the external device.

9. The mobile terminal of claim 8, wherein the external device detection unit detects at least one signal on the first and second signal pins.

10. The mobile terminal of claim 9, wherein the external device detection unit comprises:
    a filter for converting the at least one signal on the at least one of the first and second signal pins into a direct current signal; and
    a comparator for comparing the direct current signal with the reference values.

11. The mobile terminal of claim 10, further comprises a buffer for buffering the at least one signal.

12. The mobile terminal of claim 7, wherein the external device comprises an electrical supply unit.

13. The mobile terminal of claim 12, wherein the interface unit electrically shorts the first and second signal lines when the external device comprises an electrical supply unit.

14. The mobile terminal of claim 7, wherein the control unit controls a voltage level of the signal transmitted to the external device.

15. The mobile terminal of claim 7, wherein the interface unit comprises a Universal Serial Bus (USB) port.

* * * * *